US011229955B2

(12) United States Patent
Laurensan

(10) Patent No.: US 11,229,955 B2
(45) Date of Patent: Jan. 25, 2022

(54) METHOD FOR MANUFACTURING A PART OF ELECTROCONDUCTIVE MATERIAL BY ADDITIVE MANUFACTURING

(71) Applicant: SAFRAN, Paris (FR)

(72) Inventor: Frederic Laurensan, Moissy-Cramayel (FR)

(73) Assignee: SAFRAN, Paris (FR)

( * ) Notice: Subject to any disclaimer, the term of this patent is extended or adjusted under 35 U.S.C. 154(b) by 385 days.

(21) Appl. No.: 16/330,688

(22) PCT Filed: Sep. 7, 2017

(86) PCT No.: PCT/FR2017/052385
§ 371 (c)(1),
(2) Date: Mar. 5, 2019

(87) PCT Pub. No.: WO2018/046862
PCT Pub. Date: Mar. 15, 2018

(65) Prior Publication Data
US 2021/0221050 A1   Jul. 22, 2021

(30) Foreign Application Priority Data
Sep. 8, 2016  (FR) ...................................... 1658344

(51) Int. Cl.
*B29C 64/153*  (2017.01)
*B29C 37/00*  (2006.01)
(Continued)

(52) U.S. Cl.
CPC .............. *B22F 10/66* (2021.01); *B22F 3/105* (2013.01); *B22F 10/20* (2021.01); *B22F 10/40* (2021.01);
(Continued)

(58) Field of Classification Search
None
See application file for complete search history.

(56) References Cited

U.S. PATENT DOCUMENTS 8,267,683 B2 *  9/2012  Inoue ................. A61C 13/0019
425/145
2004/0031780 A1  2/2004  Hagemeister et al.
(Continued)

FOREIGN PATENT DOCUMENTS

EP  2540419 A1  1/2013
FR  2993801 A1  1/2014
(Continued)

OTHER PUBLICATIONS

Zeng, Kai. "Optimization of support structures for selective laser melting." (2015). (Year: 2015).*
(Continued)

*Primary Examiner* — Anthony M Liang
(74) *Attorney, Agent, or Firm* — Womble Bond Dickinson (US) LLP

(57) ABSTRACT

Method for manufacturing at least one part (8) of electroconductive material by additive manufacturing on a bed of powder characterized in that it comprises the steps of manufacturing the part on a support plate of a first additive manufacturing machine, layer by layer, said part being bounded by an external contour surface portion which is opposite and spaced apart from said support plate, and which is connected to said support plate by at least one bridge of support material of the part, providing a reference element (51) on the support plate in a predetermined position, mounting said support plate on a second machine (60) for cutting said at least one part, and using a wire (62-66) of said second machine for cutting by electrical discharge machining said at least one part by passing it between said at least
(Continued)

one part and said support plate, along and at the level of said surface portion.

7 Claims, 3 Drawing Sheets

(51) Int. Cl.
    *B22F 10/20*      (2021.01)
    *B22F 10/40*      (2021.01)
    *B22F 3/105*      (2006.01)
    *B33Y 40/00*      (2020.01)
    *B33Y 10/00*      (2015.01)
    *B22F 10/66*      (2021.01)
    *B33Y 40/20*      (2020.01)
    *B22F 10/47*      (2021.01)

(52) U.S. Cl.
    CPC .............. *B22F 10/47* (2021.01); *B33Y 40/20* (2020.01); *B33Y 10/00* (2014.12); *B33Y 40/00* (2014.12)

(56) References Cited

U.S. PATENT DOCUMENTS

| | | | | |
|---|---|---|---|---|
| 2011/0170977 A1* | 7/2011 | Vagt | ...................... | B29C 64/153 |
| | | | | 409/131 |
| 2011/0311389 A1* | 12/2011 | Ryan | ........................ | B22F 3/15 |
| | | | | 419/27 |
| 2013/0004680 A1* | 1/2013 | Godfrey | .................. | B23P 15/02 |
| | | | | 427/554 |
| 2015/0197862 A1 | 7/2015 | Engel et al. | | |
| 2015/0258609 A1* | 9/2015 | Teulet | .................... | B33Y 40/00 |
| | | | | 419/53 |
| 2016/0001365 A1 | 1/2016 | Blanchet | | |
| 2016/0031010 A1 | 2/2016 | O'Neill et al. | | |

FOREIGN PATENT DOCUMENTS

| | | |
|---|---|---|
| WO | 2008/143106 A1 | 11/2008 |
| WO | 2015/092442 A1 | 6/2015 |
| WO | 2015/189600 A2 | 12/2015 |

OTHER PUBLICATIONS

International Search Report and Written Opinion received for PCT Patent Application No. PCT/FR2017/052385, dated Nov. 8, 2017, 23 pages (11 pages of English Translation and 12 pages of Original Document).

International Preliminary Report on Patentability received for PCT Patent Application No. PCT/FR2017/052385, dated Mar. 21, 2019, 19 pages (10 pages of English Translation and 9 pages of Original Document).

* cited by examiner

METHOD FOR MANUFACTURING A PART OF ELECTROCONDUCTIVE MATERIAL BY ADDITIVE MANUFACTURING

TECHNICAL FIELD

The present invention concerns a method for manufacturing a part of electroconductive material and its reference frame for the machining reworking, by additive manufacturing, in particular on a powder bed.

BACKGROUND

It is known to manufacture parts by additive manufacturing, particularly in the aeronautical field. Different techniques exist and one of the techniques consists in melting powder by means of a high-energy beam such as a laser beam (SLM technology, acronym for Selective Laser Melting). In practice, a powder bed is placed on a support plate and scanned by the laser beam to produce the part layer by layer, a third layer of melted powder being arranged above a second layer which is itself arranged above a first layer.

The support plate is of the same type as the powder and serves as a starting and hanging surface, then as a reference to the part that is manufactured on it. The part is then welded to the support plate and must be removed at the end of the manufacturing.

The separation of the part from the support plate is generally achieved by cutting the part in a plane parallel to the support plate. The part is usually reworked by machine to bring it at predetermined sides. Cutting can be done by sawing or electroerosion using EDM (acronym for Electrical Discharge Machining) technology, which has the advantage of reducing mechanical forces on the parts.

EDM technology is implemented when knowing precisely the position in space of the part to be cut, and therefore when knowing the coordinates of the part according to XYZ references. However, additive manufacturing by SLM does not allow these references to be monitored using current technology. Cutting is therefore generally carried out as close as possible to the support plate and the cut part is reworked by machining, which requires it to be mounted on a reworking machine, which is long and costly.

There is therefore a need to simplify the disengagement of a part produced by additive manufacturing of a support plate, by means of a cutting technique following a precise and industrially applicable profile in order to limit or even eliminate subsequent operations of part reworking.

This invention offers a simple, effective and cost-effective solution to this problem.

SUMMARY OF THE INVENTION

To this end, the invention proposes a method for manufacturing at least one part of electroconductive material by additive manufacturing on a powder bed, including a step of:
a) by means of a first additive manufacturing machine, manufacturing said at least one part on a support plate, layer by layer, said part being bounded by a portion of an outer contour surface which is facing and spaced from said support plate, and which is connected to said support plate by at least one support material bridge of the part,
characterized in that it further includes the steps of:
b) by means of said first additive manufacturing machine, manufacturing a reference element on the support plate in a predetermined position spaced apart from said part, so that said at least one part is located in the space with respect to said reference element,
c) mounting said support plate on a second machine for cutting said at least one part, and positioning it on said machine based on the position of said reference element,
d) using a wire from said second machine to cut by electrical discharge machining said at least one part by passing it between said at least one part and said support plate along and at the level of said surface portion.

The method according to the invention thus uses two machines, a first additive manufacturing machine and a second electrical discharge machining cutting machine. According to the invention, a single plate is used as a support for the part during its manufacturing and during its cutting. For this purpose, the support plate includes a reference element that allows the part to be precisely located on the support plate, which facilitates the cutting operation. Indeed, the support plate mounting on the second machine allows the second machine to know precisely the position of the part for its cutting, thanks to the reference element. Cutting of the part can then be carried out according to a complex trajectory and in particular not parallel to the support plate. The cutting can be done at the finished sides of the part. The invention thus allows to eliminate the operations of the prior art, subsequent to the cutting of the part, and consisting in particular in precisely positioning the part according to XYZ references and in carrying out its reworking by machining.

The method according to the invention may include one or more of the following characteristics or steps, taken in isolation from or in combination with each other:
step b) is performed before, during or after step a),
several identical parts are manufactured simultaneously in step a), and include outer contour surface portions that are aligned with each other so that said wire simultaneously cuts all the parts in step d),
said part or each of said parts is manufactured in step a) with at least one support column, which is removed by cutting in step d),
said at least one support column at least partially fills at least one through hole of the part or each of said parts,
said surface portion or each of said surface portions is not parallel to said support plate,
said material bridge forms a recess with said surface portion or each of said surface portions, said recess having a thickness configured to facilitate the initiation of machining or cutting or even the end of the cutting by said wire in step d), and
said reference element is produced by additive manufacturing simultaneously or successively to the manufacturing of the part or parts.

DESCRIPTION OF THE FIGURES

The invention will be better understood and other details, characteristics and advantages of the invention will appear more clearly when reading the following description made by way of non-limiting example and with reference to the attached drawings in which.

DETAILED DESCRIPTION

Figure 1:
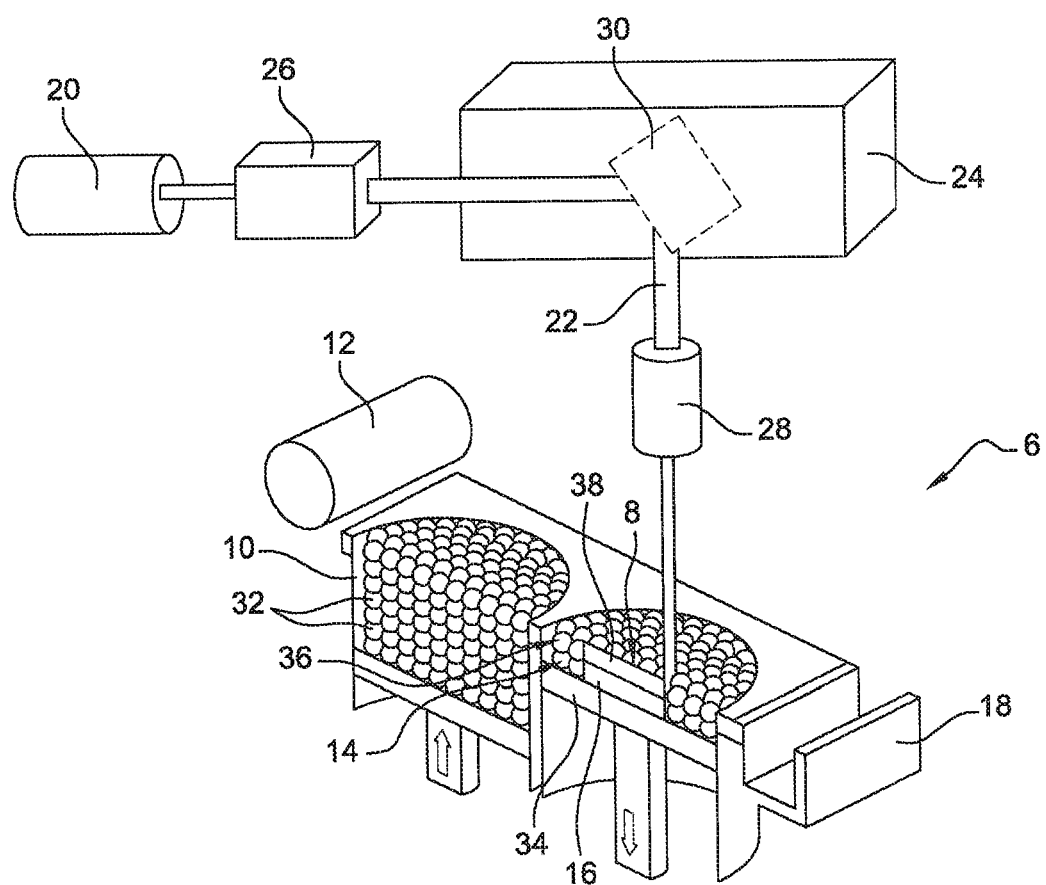
FIG. 1 is a very schematic view of an additive manufacturing machine on a powder bed.

There are two types of additive manufacturing of a part: either the part is produced by successive deposits of molten material, or the part is produced by selective melting on powder bed as shown in FIG. 1.

The machine 6 in FIG. 1 allows to manufacture a part 8, for example an aeronautics part, by selectively melting powder layers with a high energy beam.

The machine 6 includes a feeder tray 10 containing powder of an electroconductive material, a roller 12 to transfer this powder from this tray 10 and spread a first layer 14 of this powder on a construction support tray 16 (it can be a solid support, a portion of another part or a support grid used to facilitate the construction of certain parts).

The machine 6 also includes a recycling bin 18 to recover a fraction of the used powder (especially not melted or not sintered) and most of the powder in excess, after spreading the powder layer on the support plate 16. Thus, most of the powder in the recycling bin 18 is composed of new or recycled powder. Also, this recycling bin 18 is commonly called by the profession overflow bin or ashtray.

The machine 6 also includes a generator 20 of laser beam 22, and a control system 24 able to direct this beam 22 on any region of the support plate 16 in order to scan any region with a powder layer. The shaping of the laser beam and the variation of its diameter in the focal plane are done respectively by a beam dilator 26 and a focusing system 28, the whole constituting an optical system.

This device for applying the method comparable to a direct metal deposition method or DMD (acronym of Direct Metal Deposition) on a powder can use any high-energy beam instead of the laser beam 22, as long as this beam is sufficiently energetic to melt in the first case or in the other case form collars or bridges between the powder particles and a portion of the material on which the particles rest.

The roller 12 can be replaced by another suitable dispensing system, such as a reel (or hopper) associated with a scraper blade, knife or brush, adapted for transferring and spreading the powder in layer.

The control system 24 includes, for example, at least one steerable mirror 30 on which the laser beam 22 is reflected before reaching a powder layer, each point on the surface of which is always located at the same height with respect to the focusing lens, contained in the focusing system 28, the angular position of this mirror 30 being controlled by a galvanometric head so that the laser beam scans at least one region of the first powder layer, and thus follows a pre-established part profile.

The machine 6 operates in the following manner. The roller 12 is used to apply a first layer 14 of powder of a material on the support plate 16, this powder being transferred from a feeding tray 10 during a forward movement of the roller 12 then it is scraped, and possibly slightly compacted, during one (or more) return movement(s) of the roller 12. The excess powder is recovered in the recycling bin 18. A region of this first layer 14 of powder is brought, by scanning with the laser beam 22, to a temperature higher than the melting temperature of this powder (liquidus temperature). The galvanometric head is controlled according to the information contained in the database of the computer tool used for the computer-aided design and manufacturing of the part to be manufactured. Thus, the powder particles 32 of this region of the first layer 14 are melted and form a first bead 34 in one piece, integral with the support plate 16. At this stage, several regions independent of this first layer can also be scanned with the laser beam to form, after melting and solidifying the material, several first beads 34 separated from each other. The support plate 16 is lowered by a height corresponding to the already defined thickness of the first layer (between 20 and 100 μm and generally 30 to 50 μm). The thickness of the powder layer to be melted or consolidated remains a variable value from one layer to another because it is highly dependent on the porosity of the powder bed and its flatness, while the pre-programmed displacement of the support plate 16 is an invariable value with the exception of clearance. A second layer 36 of powder is then applied to the first layer 14 and to this first bead 34, and then a region of the second layer 36 which is partially or completely located above this first bead 34 is heated by exposure to the laser beam 22, so that the powder particles of this region of the second layer 36 are melted, with at least a portion of the first bead 34, and form a second bead 38 in one piece or consolidated, the whole of these two beads 34 and 38 thus forming a block. For this purpose, the second bead 38 is advantageously already fully bound as soon as a portion of this second bed 38 is bound to the first bead 34. It is understood that depending on the profile of the part to be built, and in particular in the case of an undercut surface, the above-mentioned region of the first layer 14 may not lie, even partially, below the above-mentioned region of the second layer 36, so that in this case the first bead 34 and the second bead 38 do not form a block in one piece. This construction method of the part layer by layer is then continued by adding additional layers of powder on the already formed assembly. Scanning with the beam 22 allows to construct each layer by giving it a shape in accordance with the geometry of the part to be produced. The lower layers of the part cool more or less quickly as the upper layers of the part are built.

In order to reduce the contamination of the part, for example by dissolved oxygen, oxide(s) or another pollutant during its manufacturing layer by layer as described above, this manufacturing must be carried out in an enclosure with a controlled degree of hygrometry and adapted to the method/material combination, filled with a neutral gas (non-reactive) against the material under consideration such as nitrogen ($N_2$), argon (Ar) or helium (He) with or without the addition of a small quantity of hydrogen ($H_2$) known for its reducing power. A mixture of at least two of these gases can also be considered. To prevent contamination, particularly by oxygen from the surrounding environment, it is usual to put this enclosure under overpressure.

Thus, depending on the current prior art, selective fusion or selective laser sintering allows to build low-polluted parts with good dimensional accuracy, whose three-dimensional geometry can be complex.

Selective fusion or selective laser sintering preferably further uses powders of spherical morphology, clean (i.e. not contaminated by residual elements from the synthesis), very fine (the size of each particle is between 1 and 100 μm and preferably between 45 and 90 μm), which allows to obtain an excellent surface state of the finished part.

Selective melting or selective laser sintering also allows to reduce manufacturing times, costs and fixed costs compared to a moulded, injected or machined into the mass part.

Figure 2:
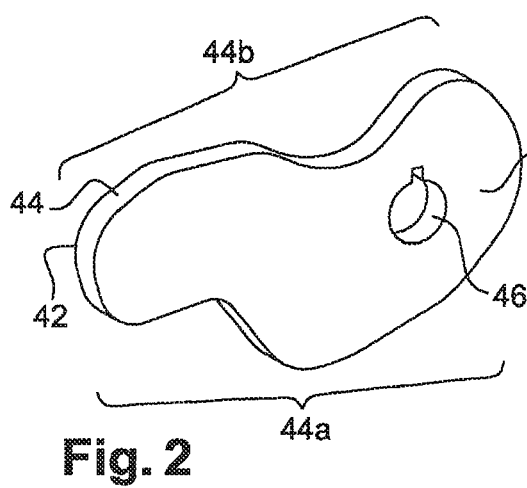
FIG. 2 is a schematic view in perspective of a part produced with the method according to the invention.

FIG. 2 and followings illustrate an embodiment of the method according to the invention.

FIG. 2 illustrates an example of part 8 that can be manufactured using the machine 6, this part 8 having here a complex shape. It has a generally flat and thick shape, with a substantially potato-shaped contour. It thus has two faces, respectively front 40 and rear 42, substantially parallel, and a contour surface 44 which follows the aforementioned contour while being substantially perpendicular to the aforementioned faces 40, 42. The faces 40, 42 are here substantially vertical in the example shown.

The part 8 also includes a substantially cylindrical through-hole 46, the ends of which lead to the two front face 40 and rear face 42 respectively.

The contour surface 44 of the part 8 includes a lower portion 44a facing down, and an upper portion 44b facing up.

Figure 3:
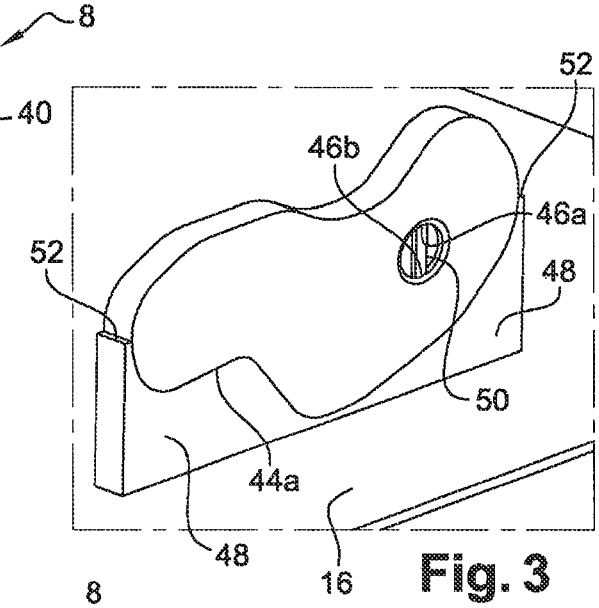
FIGS. 3 to 5 represent part production steps using a first additive manufacturing machine.

A first step of the method shown in FIG. 3 consists of using an additive manufacturing machine 6 such as the one shown in FIG. 1 to produce the part 8 of FIG. 2 on a support plate 16. The part 8 of complex shape must be supported to prevent it from collapsing due to manufacturing constraints. The lower part 44a of the contour surface of the part, which faces the support plate 16, is thus connected to the support plate by at least one support material bridge 48 of the part. The material bridge 48 is here substantially vertical and extends over the entire thickness of the part 8. In the same way, the upper portion 46a of the inner cylindrical surface of the hole 46 is connected by substantially vertical support columns 50 to the lower portion 46b of this cylindrical surface, to support the material being manufactured located vertically above the hole 46.

It is understood that the lower portion 44a of the contour surface 44 is a fictitious portion as long as the part is not cut. The above-mentioned material bridge 48 extends over the entire extent of the portion 44, i.e. until the junction areas of portions 44a, 44b. In these areas, the material bridge 48 includes excessive thicknesses so as to create recesses 52 to facilitate the reference setting of the cutting by a wire, for example made of brass, as will be explained in more detail below.

Figure 4:
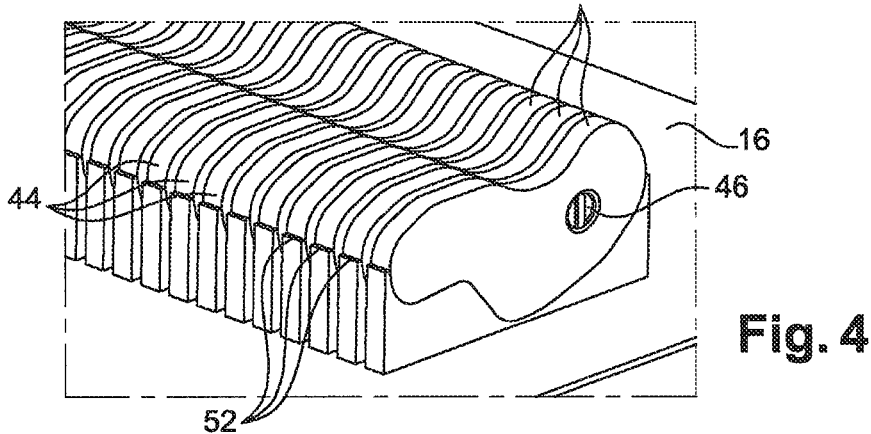
Figure 5:
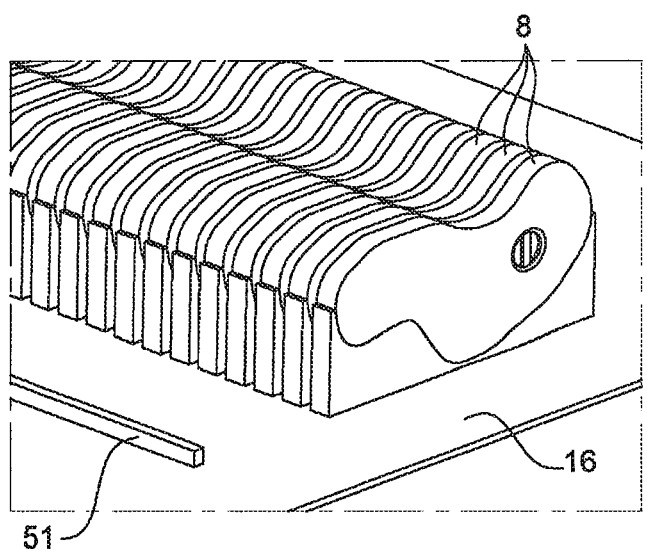

As shown in FIG. 4, several identical parts 8 can be manufactured simultaneously on the support plate 16. The parts 8 are manufactured here by being arranged side by side and spaced apart from each other. The parts 8 are arranged so that their contour surfaces 44 are aligned, as well as their holes 46.

Another step in the method, which may take place before, during or after the manufacturing step of parts 8, is to provide a reference element 51 on the support plate. In the example shown, reference element 51 is a strip applied to the upper face of the support plate 16 near the parts 8. It extends here substantially parallel to the axis of the holes 46 or the part axis. It has a substantially rectangular shape cross-section.

Advantageously, the reference element 51 is manufactured simultaneously with parts 8, so by additive manufacturing. It is therefore the computer system associated with the additive manufacturing machine 6 that accurately determines the relative positions of parts 8 and reference element 51.

Figure 6:
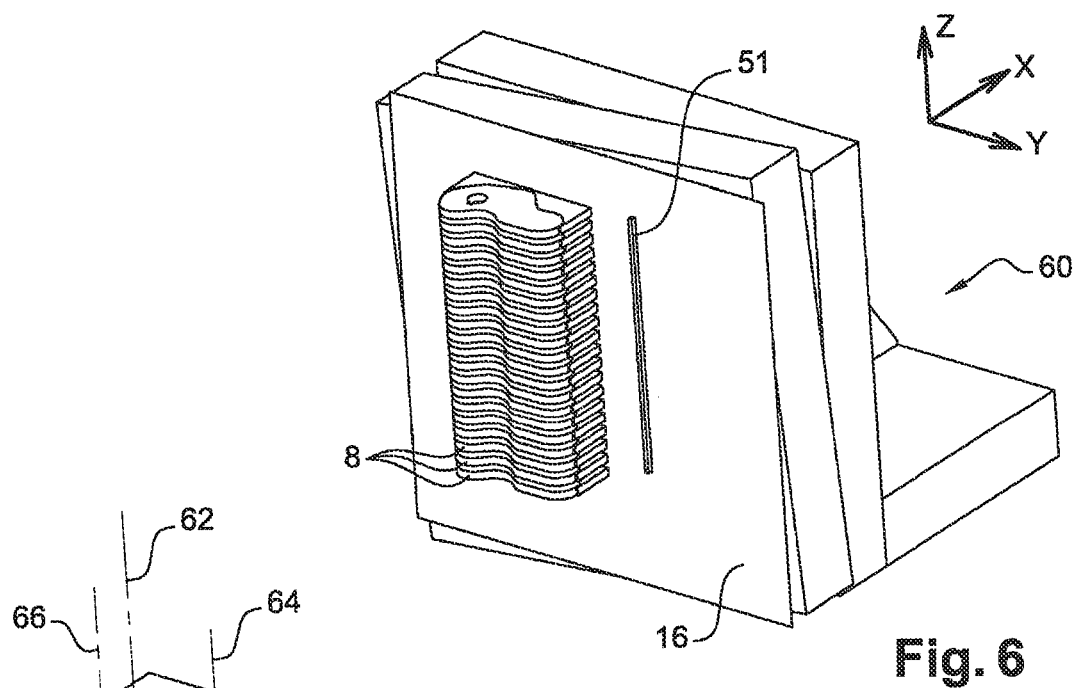
FIGS. 6 and 7 represent part cutting steps with a second machine.

After the completion of the parts 8 by additive manufacturing, the support plate 16 is dismantled from the first machine 10 and mounted on a second machine 60 for electrical discharge machining cutting. The machine is partially and very schematically represented by an angle bracket in FIG. 6.

The support plate 16 is precisely positioned in an orthonormed XYZ system on the machine 60. It is the reference element 51 that allows the plate 16 to be in a precise position on the machine 60. For this purpose, the machine 60 can be equipped with a probe or include means configured to abut on the reference element 51. The plate 16 is then moved in translation along the Y and Z axes and/or in rotation around the X axis until the reference element is correctly positioned and its position is recorded by the computer system associated with the machine 60. The plate 16 is then flanged to the angle bracket.

The positions of the parts 8 opposite the reference element 51 are known, and their shapes and dimensions are also known. This data is recorded in the computer software of the machine 60, which allows it to determine the cutting wire trajectories.

The cutting is carried out by electrical discharge machining, the wire being supplied with an electric current. The wire is moved into the material to be cut and electrical discharges between the material (electroconductive) and the wire cause the material to be cut by electrical discharge machining.

The material bridge 48 preferably has a thickness at the level of the recesses 52 which is at least equal to 1 mm (measured in the plane of the part 8 considered) in order to allow the passage of the cutting wire 46 between the part and the support plate, the wire having a diameter at most equal to 1 mm in the example represented.

Figure 7:
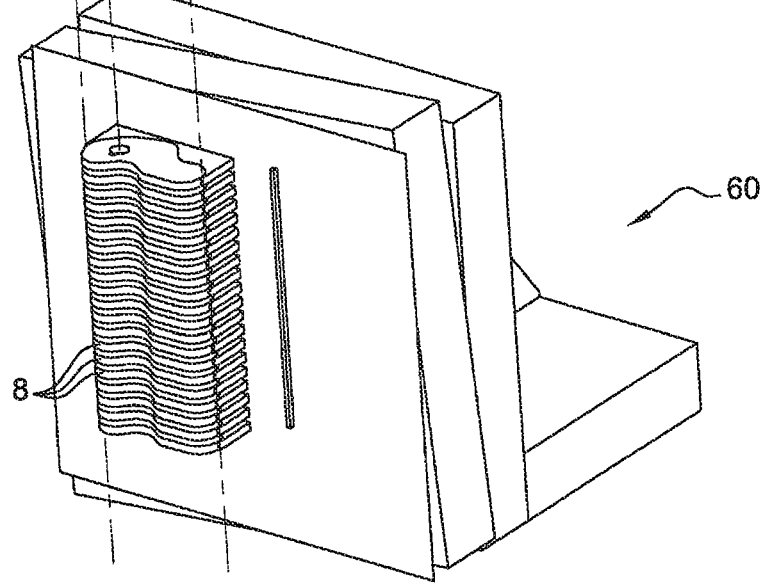

In the example shown in FIG. 7, the wire (schematically represented by dotted lines 62) is first inserted into the holes 46 of the parts, which are partially closed by the columns 50, and the wire is moved around the axis of the holes 46 to cut the columns at their ends and thus define the cylindrical surfaces of the holes 46 of the parts, in two successive steps.

The wire (schematically represented by the dotted lines 64) is then moved along the portions 44a of the parts by first engaging the wire at the level of the recesses 52 on one side of the parts 8 and completing the cutting by the recesses on the opposite side (the output wire being schematically represented by the dotted lines 66).

Figure 8:
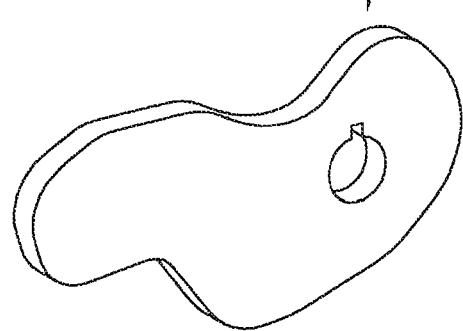
FIG. 8 is a schematic perspective view of one of the parts obtained by the steps illustrated in FIGS. 3 to 7.

This results in a series of parts 8 cut to the finished sides, such as the one shown in FIG. 8.

The invention claimed is:

1. A method for manufacturing at least one part of electroconductive material by additive manufacturing on a powder bed, including a step of:
    a) by means of a first additive manufacturing machine, manufacturing said at least one part on a support plate, layer by layer, said part being bounded by a portion of an outer contour surface which is facing and spaced from said support plate, and which is connected to said support plate by at least one support material bridge of the part,
   further comprising the steps of:
    b) by means of said first additive manufacturing machine, manufacturing a reference element on the support plate in a predetermined position spaced apart from said part, so that said at least one part is located in the space with respect to said reference element,
    c) mounting said support plate on a second machine for cutting said at least one part, and positioning said support plate on said machine based on the position of said reference element,
    d) using a wire from said second machine to cut by electrical discharge machining said at least one part by passing the wire between said at least one part and said support plate along said portion of the outer contour surface.

2. The method according to claim 1, wherein several identical parts are manufactured simultaneously in step a), and include outer contour surface portions that are aligned with each other so that said wire simultaneously cuts all the parts in step d).

3. The method according to claim 1, wherein said part or each of said parts is manufactured in step a) with at least one support column, which is removed by cutting in step d).

4. The method according to claim 3, wherein said at least one support column at least partially fills at least one through hole of the part or each of said parts.

5. The method according to claim 1, wherein said surface portion or each of said surface portions is not parallel to said support plate.

6. The method according to claim 1, wherein said material bridge forms a recess with said surface portion or each of said surface portions, said recess having a thickness configured to facilitate the initiation of the cutting or even the end of the cutting by said wire in step d).

7. The method according to claim 1, wherein said reference element is produced simultaneously or successively with the manufacturing of the part or parts.

* * * * *